United States Patent
Yoshimura

(10) Patent No.: US 6,396,960 B1
(45) Date of Patent: *May 28, 2002

(54) METHOD AND APPARATUS OF IMAGE COMPOSITE PROCESSING

(75) Inventor: Hideyoshi Yoshimura, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,971

(22) Filed: Jun. 2, 1998

(30) Foreign Application Priority Data

Jun. 20, 1997 (JP) .............................. 9-163888

(51) Int. Cl.[7] ................................. G06K 8/36
(52) U.S. Cl. ........................ 382/284; 382/275; 358/450
(58) Field of Search ................................ 382/284, 275; 358/450, 451, 452, 453, 540; 348/584, 597, 598, 599; 345/435

(56) References Cited

U.S. PATENT DOCUMENTS

| 4,298,895 A | * | 11/1981 | Arai et al. ................... 382/275 |
| 4,706,205 A | * | 11/1987 | Akai et al. ................... 382/284 |
| 4,747,156 A | * | 5/1988 | Wahl ........................... 382/275 |
| 5,317,420 A | * | 5/1994 | Kuwahara ..................... 358/463 |
| 5,581,377 A | * | 12/1996 | Shimizu et al. .............. 358/540 |
| 5,721,624 A | * | 2/1998 | Kumashiro et al. ......... 382/284 |
| 5,982,951 A | * | 11/1999 | Katayama et al. ........... 382/284 |
| 6,148,118 A | * | 11/2000 | Murakami ................... 382/284 |

FOREIGN PATENT DOCUMENTS

JP   5-122606   5/1993

* cited by examiner

Primary Examiner—Amelia M. Au
Assistant Examiner—Jingge Wu
(74) Attorney, Agent, or Firm—Dike, Bronstein, Roberts & Cushman IP Group Edwards & Angell, LLP; David G. Conlin; David A. Tucker

(57) ABSTRACT

An image composite processing method for composing a plurality of images, each having a duplicate portion, into a single composite image based on a retrieved duplicate portion, wherein the duplicate areas of every two adjacent composite subject images are compared and one of the duplicate areas is adopted based on the comparison result.

20 Claims, 10 Drawing Sheets

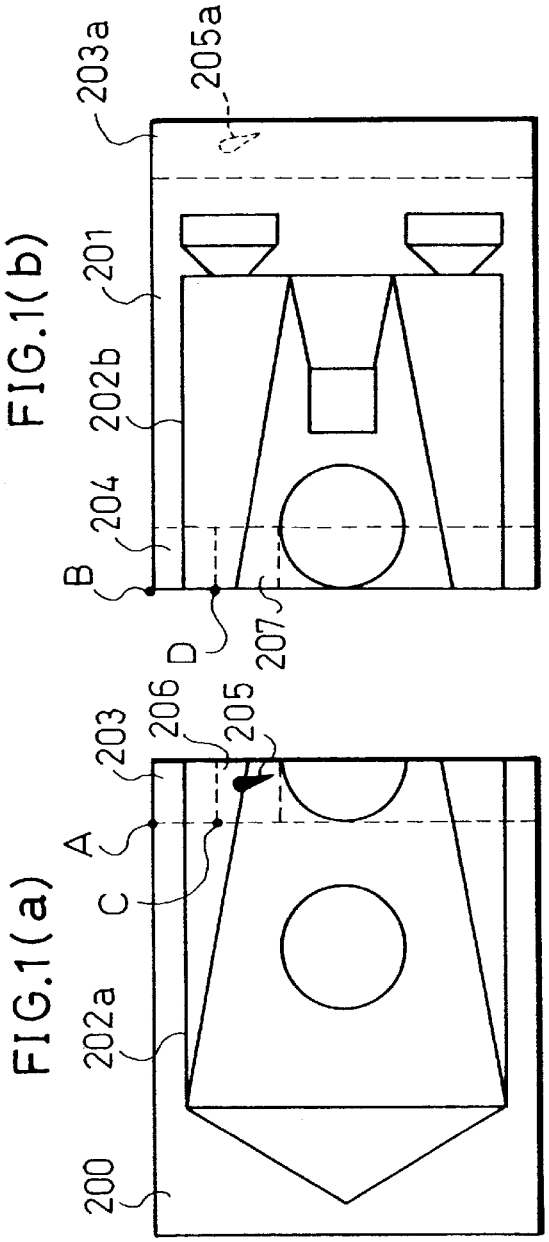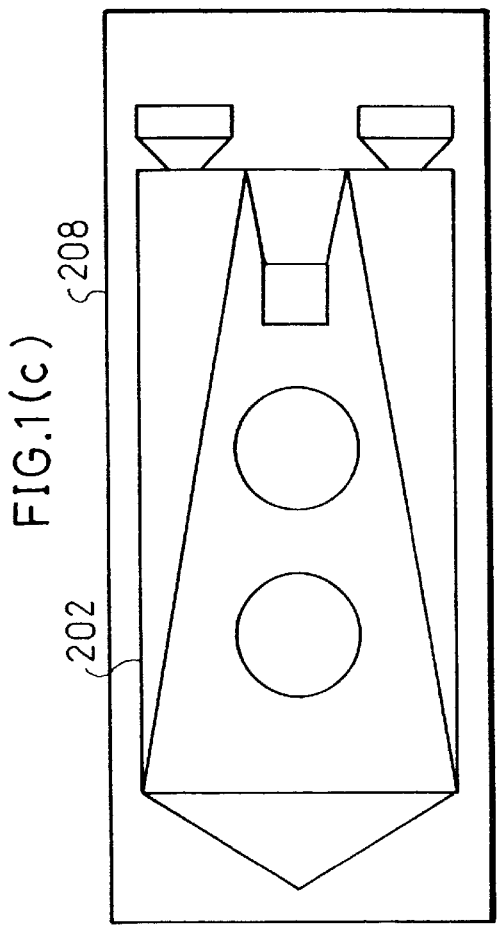

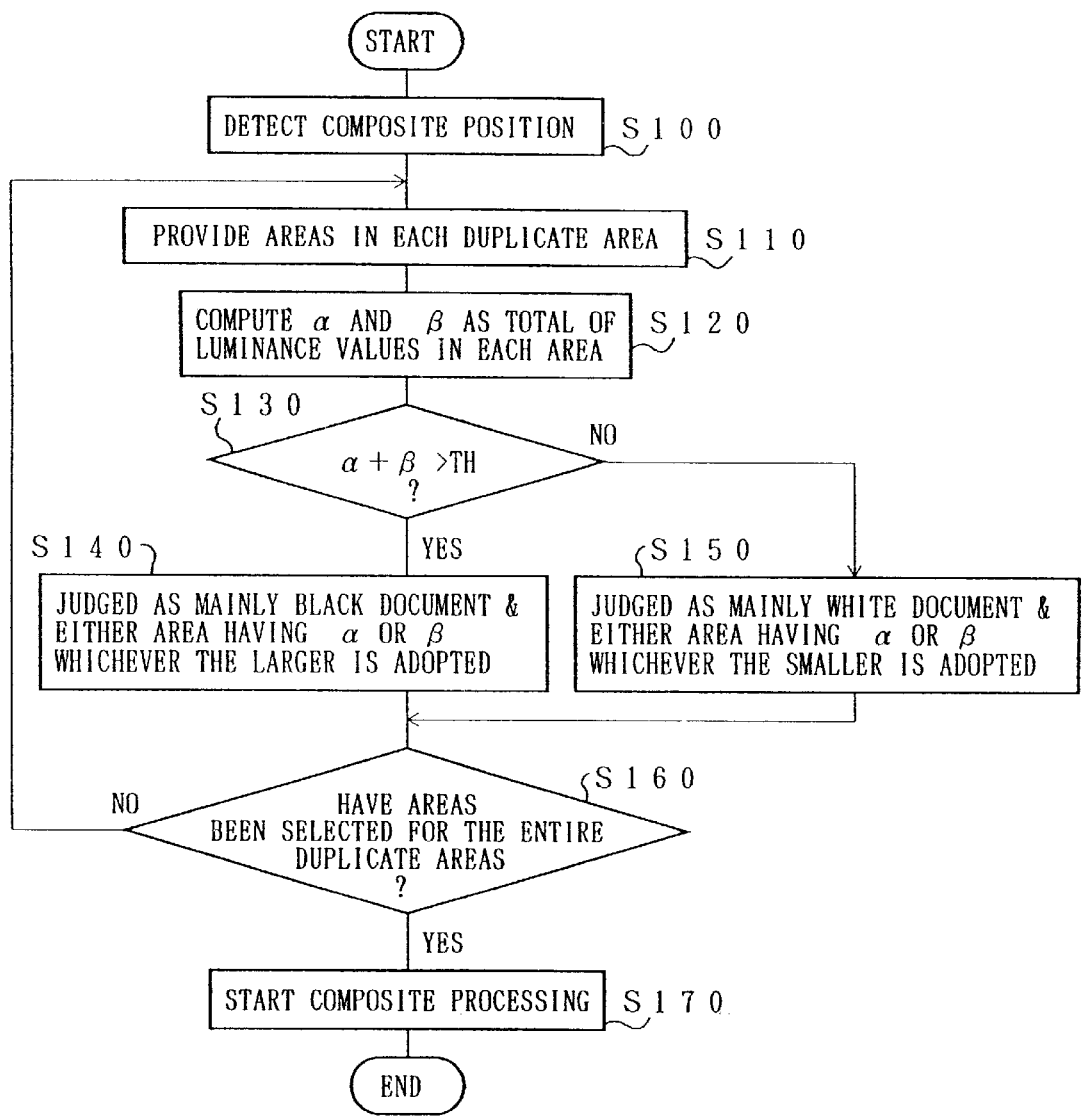

METHOD AND APPARATUS OF IMAGE COMPOSITE PROCESSING

FIELD OF THE INVENTION

The present invention relates to method and apparatus of image composite processing for composing a plurality of images to be outputted as a single image, and more particularly, to method and apparatus for composing a plurality images each having a duplicate area into a single image.

BACKGROUND OF THE INVENTION

Conventionally, an image reading apparatus generally reads an image in the following manner. That is, an original document is placed on a transparent document table made of glass or the like, and optically scanned with a beam of light emitted from a light source. The resulting reflected light is formed into an image at a photo-receiving section of a photoelectric transfer element serving as a reading element, such as a CCD (Charge Coupled Device). Then, the resulting optical signal is converted into an analog electric signal in each element. Further, the analog electric signal is outputted in the form of a digital electric signal by means of an A/D convertor or the like, whereby image data are obtained.

When a range of the document table on which an original document can be placed is limited, or when an image forming range is limited, the above image reading apparatus can not read an entire image in a single reading action. For example, since an image forming range of the photo-receiving section of the CCD is limited, the photo-receiving section can not read an image on a large-size document in a single action. Thus, the image has to be divided into a plurality of sections, and each is read separately. For this reason, an image on the original document is divided into a plurality of sections and an image in each section is read separately first, and thence a plurality of resulting images are composed to be outputted as image data on a single sheet.

In such a case, when the read images are composed, the junctions of the images should be matched with each other very precisely. However, when an original document is placed on the document table per section by the user to be read, the position of the junction has to be detected. Moreover, if there is an area having no matching junction, the image data should be processed in a special manner to create a natural composite image. In other words, there is a problem that, when the junctions do not match with each other, very troublesome jobs, such as interpolation, are required, thereby extending the processing time undesirably.

In contrast, if an original document is not placed on the document table manually but fed to the document table mechanically, or the reading apparatus is arranged to divide an original document placed on the document table into a plurality of sections and read each section, an image in each section is read after the original document is divided precisely at the laminated portion of the junctions. Accordingly, the matching detection is simplified and the images in the divided sections can be outputted as a single natural image.

However, there still arises a problem of mechanical accuracy in the automatic feeding of the original document and in the movement of the reading optical system. Thus, although the original document can be placed more accurately than being placed manually to a predetermined position, mechanical errors and the like cause a problem that the interpolation processing and composite processing take too long.

To solve the above problem, for example, Japanese Laid-open Patent Application No. 122606/1993 (Tokukaihei No. 5-122606) proposes an image composite processing method, which will be briefly explained in the following with reference to FIG. 10.

Here, an image 101 of FIG. 10(a) and an image 102 of FIG. 10(b) are composite subject images on an original document divided into two sections and read by an image forming apparatus equipped with the CCD.

The composite subject images 101 and 102 are formed in such a manner that each has a duplicate portion (areas 105 and 104) of an object (read image) 103, and each composite subject image is divided into a plurality of images. When the composite subject images 101 and 102 are monochromic images, each pixel includes luminance (density of image and the like) information.

On the other hand, when the composite subject images 101 and 102 are color images, each pixel includes color information, such as chromaticity.

An end area 104 is an area of the composite subject image 102 at the end which will be laminated to the composite subject image 101. A lamination area 105 is an area of the composite subject image 101 including a partial duplicate area of the end area 104 of the composite subject image 102.

In the above image composite processing method, when the composite subject images 101 and 102 are monochromic images, differences of the luminance values between the pixels on the end area 104 of the composite subject image 102 and those on the lamination area 105 of the composite subject image 101 are computed and added up.

When the composite subject images 101 and 102 are color images, an image composite processing apparatus computes differences of the chromaticity between the pixels on the end area 104 and those one the lamination area 105 and adds up the same.

In the above image composite processing method, after the above computation, an area where a total of the differences of the luminance values or chromaticity becomes 0 or a minimum value is found in the lamination area 105. More specifically, an area taken out from the image 101 is shifted to the left per pixel while the comparison with the end area 104 is being carried out until an area where the differences of the luminance values or chromaticity becomes 0 or a minimum value is found. When the lamination area 105 such that satisfies the above condition is obtained, the image composite processing apparatus composes the composite subject images 101 and 102 in such a manner that the end area 104 overlaps the lamination area 105, whereby a composite image 106 as shown in FIG. 10(c) is obtained.

According to the above method, areas that should be composed can be found accurately by finding the duplicate areas, thereby making it possible to obtain a natural composite image regardless of mechanical accuracy errors or the like. Moreover, the finding action is accelerated and the composite processing is carried out accurately.

However, the above conventional method has a problem as follows. That is, when an image is formed, an unwanted image is also formed occasionally on the lamination area of one of the composite subject images. Examples of such an unwanted image are an image formed when light is scattered by flaws or the like on the camera lens of the image forming apparatus equipped with the CCD, and an image formed by stain or dust. When this happens, the unwanted image is directly outputted in the composite image in the conventional method.

In other words, as shown in FIG. 10(a), when an unwanted image (noise image) 107, which is not found in the original image 103, is outputted through the CCD for the above reason, the noise image 107, which should not have been formed, is formed on the resulting composite image 103 as well.

SUMMARY OF THE INVENTION

The present invention is devised to solve the above problems, and it is therefore an object of the present invention to provide method and apparatus of image composite processing which can output a desired composite image even when an unwanted image is formed on a composite area on one of composite subject images by eliminating such an unwanted image.

To fulfill the above and other objects, an image composite processing method of the present invention is an image composite processing method for composing a plurality of images, each having a duplicate area, into a single composite image based on a retrieved duplicate area, wherein the plurality of images are composed into the single composite image by comparing the duplicate areas of every two adjacent composite subject images, and adopting one of the duplicate areas based on a comparison result.

According to the above arrangement, the duplicate areas of the images in every two adjacent divided sections are searched, and one of the duplicate areas is adopted when the images in the two adjacent divided sections are composed. Thus, the duplicate areas of every two adjacent images are compared, and one of the duplicate areas is adopted for the composition based on the comparison result. Here, the duplicate area having an unwanted image is excluded from the selection subject, and the other duplicate area is used for the composite processing. Consequently, it has become possible to obtain a composite image from which the unwanted image is eliminated.

Further, when the above image composite processing method is arranged in such a manner that the duplicate areas are divided into a plurality of comparison subject areas so that the duplicate areas are compared per comparison subject area and adopted areas for composite processing are determined per comparison subject area based on the comparison result, the comparison processing can be simplified by comparing the duplicate area per comparison subject area, while an area having the unwanted image can be extracted precisely. In other words, when the duplicate areas are divided into a plurality of comparison subject areas and compared per comparison subject area, the non-matching state can be found more accurately than comparing the duplicate areas entirely.

Also, in the above image composite processing method, if each pixel value of the duplicate areas where the images are composed is added cumulatively, and which duplicate area should be adopted is determined by comparing the addition results, the duplicate area having the unwanted image can be found by employing relatively simple circuitry. Particularly, in this case, if the pixel values are added cumulatively in each of the comparison subject areas obtained by dividing the duplicate areas, there is a big difference in the comparison result as has been explained above. Hence, the comparison subject area having the unwanted image can be extracted and excluded from the composite subject in a secure manner. Consequently, the comparison subject area having no unwanted image can be adopted for the composite processing.

Further, in the above image composite processing method, before the cumulative added values of the pixel values in the duplicate areas are compared, if a total of the cumulative added values is compared with a predetermined threshold value and the image type is judged based on the comparison result, the duplicate area whose cumulative added value is the larger or smaller is determined as the adopted area based on the judged image type. In other words, the adopted area is determined based on whether the composite subject images are of the picture image type, text image type, etc. Consequently, the area having the unwanted image can be extracted more precisely, and the unwanted image can be eliminated when the images are composed.

To fulfill the above and other objects, an image composite processing apparatus of the present invention is an image composite processing apparatus for composing a plurality of images, each having a duplicate area, into a single composite image based on a retrieved duplicate area, wherein the plurality of images are composed into the single composite image by comparing the duplicate areas of every two adjacent composite subject images, and adopting one of the duplicate areas based on a comparison result.

For a fuller understanding of the nature and advantages of the invention, reference should be made to the ensuing detailed description taken in conjunction with the accompanying drawings.

BRIEF DESCRIPTION OF THE DRAWINGS

FIGS. 1(*a*) through 1(*c*) are views explaining an image composite processing method in accordance with an example embodiment of the present invention, and FIG. 1(*a*) is a view showing an image reading pattern for a first reading range, FIG. 1(*b*) is a view showing an image reading pattern for a second reading range, and FIG. 1(*c*) is a view showing a state after the images in the first and second reading ranges are composed through the above image composite processing method;

FIG. 2 is a flowchart explaining the principle of the above image composite processing;

DESCRIPTION OF THE EMBODIMENTS

Referring to FIGS. 1 through 9, the following description will describe an example embodiment of the present invention.

Figure 3:
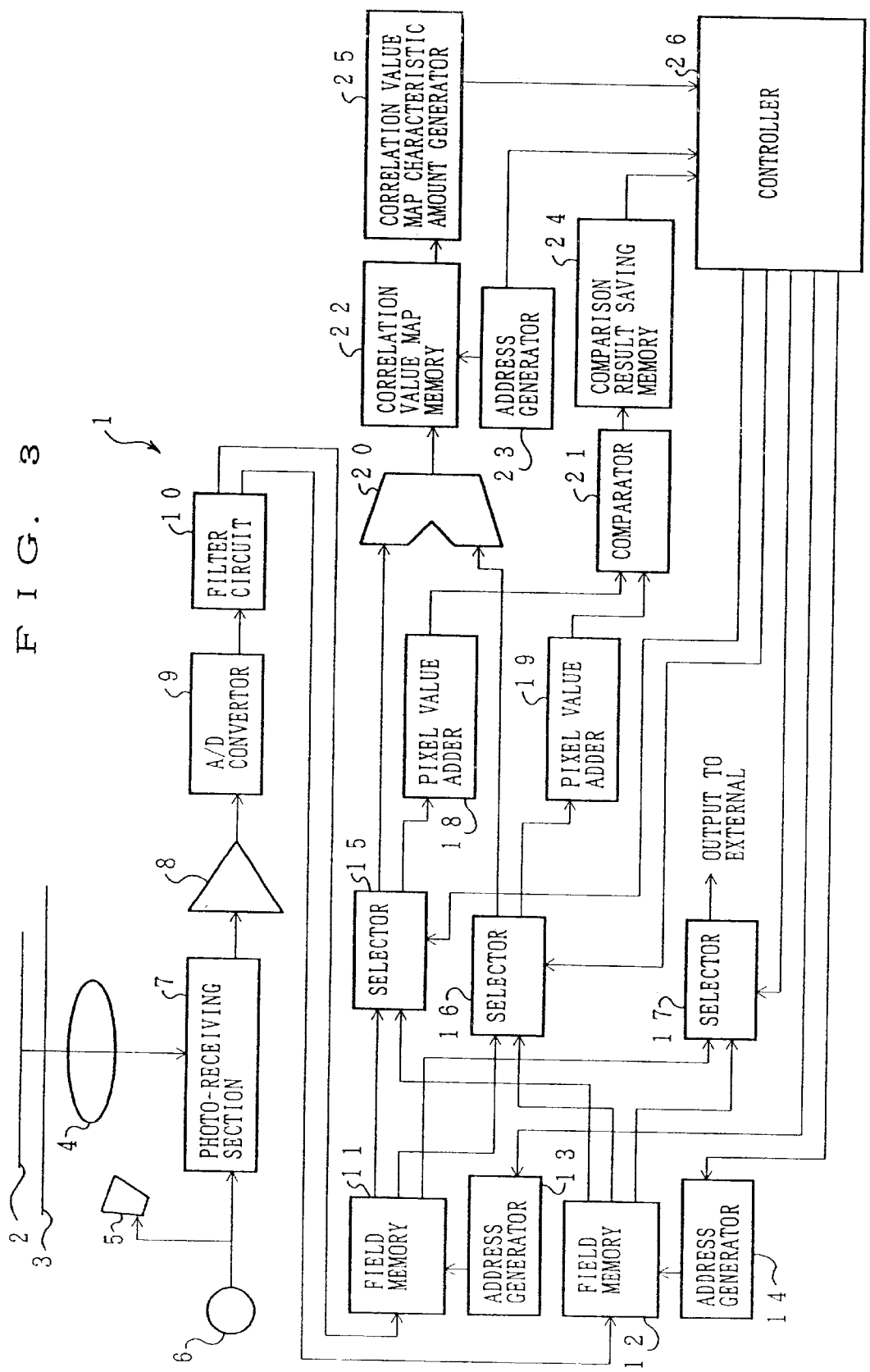
FIG. 3 is a view showing an arrangement of an image composite processing apparatus in accordance with an example embodiment of the present invention, and it is a block diagram depicting circuitry furnished with an image reading section for reading an image on an original document and a composite processing section for composing read images through the composition processing.

FIG. 1 is a view explaining an image composite processing method of the present embodiment, and to simplify the explanation, assume that an image is divided into two sections and each is read separately. FIG. 2 is a main flowchart detailing a processing procedure of the present image composite processing method. FIG. 3 is a block diagram depicting an arrangement of an image composite processing apparatus 1 of the present embodiment to realize the above composite processing. The image composite processing apparatus 1 is furnished with an image reading section and a composite processing section for applying image processing to read images.

To begin with, an arrangement of the image composite processing apparatus 1 will be detailed with reference to FIG. 3. The image reading section of the image composite processing apparatus 1 includes a document table 3 on which an original document 2 is placed at a predetermined position, a lens 4, a halogen lamp 5, a moving motor 6, a photo-receiving section 7 having a 2-D CCD, an amplifier 8, an A/D convertor 9, and a filter circuit 10.

The image composite processing section of the image composite processing apparatus 1 includes field memories 11 and 12, address generators 13 and 14, selectors 15, 16, and 17, pixel value adders 18 and 19, an Euclidean computer 20, a comparator 21, a correlation value map memory 22, an address generator 23, a comparison result saving memory 24, a correlation value map characteristic amount generator 25, and a controller 26.

The halogen lamp 5 emits light to the original document 2 placed on the document table 3 at the reference position. The lens 4 focuses reflected light from an image on the original document 2 to the photo-receiving section 7 to form an image. The moving motor 6 moves the halogen lamp 5 and photo-receiving section 7 along the bottom surface of the original document 2 placed on the document table 3. The moving motor 6 optionally moves the lens 4.

The photo-receiving section 7 is driven by the moving motor 6 to move along the bottom surface of the document table 3 and stop at an adequate position, so that it reads a predetermined range of an image on the original document 2 in a single action by forming an image through the lens 4. Alternatively, when the photo-receiving section 7 can not read the entire image on the original document 2 in a single action, the photo-receiving section 7 and the like are moved further until they arrive a position where they oppose an unread area of the original document 2 and read the remaining image.

The amplifier 8 amplifies the read image data from the photo-receiving section 7, for example, an analog output corresponding to the image density, to a predetermined value. The A/D convertor 9 converts an analog signal outputted from the amplifier 8 to digital data. The filter circuit 10 applies the processing, such as median filtering and edge effect, to the output data from the A/D convertor 9.

The field memories 11 and 12 save the output data from the filter circuit 10 alternately. More specifically, when the photo-receiving section 7 has to read a plurality of images in the sections divided at their respective positions, the image data read from the image in each divided section are saved in the field memories 11 and 12 alternately. As will be described below, in the image composite processing of the present embodiment, the image data stored in the field memory 11 and the image data stored in the field memory 12 are composed.

The selectors 15 and 16 selectively output the outputs from the field memories 11 and 12 to the Euclidean computer 20 at a command from the controller 26. The Euclidean computer 20 performs an Euclidean computation using the outputs from the selectors 15 and 16, and outputs the result. The correlation value map memory 22 saves an output from the Euclidean computer 20. The correlation value map characteristic amount generator 25 extracts a characteristic amount of a correlation value map, and outputs the same to the controller 26.

The address generators 13 and 14 generate addresses used when the field memories 11 and 12 store the read image data and retrieve the stored image data at a command from the controller 26. The pixel value adders 18 and 19 add up the values (e.g. luminance values) of pixels with respect to area data (which will be described below) inputted from the field memories 11 and 12 through the selectors 15 and 16, respectively.

The comparator 21 compares the area data added up by the pixel value adders 18 and 19, and, based on the comparison result, determines adopted areas which will be used in the composite processing. In other words, the comparator 21 determines composite areas which will be used when the read images in the divided sections are composed. The comparison result is stored in the comparison result saving memory 24.

The controller 26 issues a command to the address generators 13 and 14 and the like upon receipt of the data from the correlation value map characteristic amount generator 25 and comparison result saving memory 24. On the other hand, when the composite areas are determined, the controller 26 outputs the data retrieved from the field memories 11 and 12 through the selector 17 as the final composite data.

Principle of Composite Processing Method of the Present Invention

In the following, the image composite processing method in accordance with the present embodiment of the present invention will be explained with reference to FIGS. 1 through 3. As will be described below, this processing can be realized by the image composite processing apparatus 1 of FIG. 3. In the first place, the principle of the composite processing method of the present invention will be explained.

FIGS. 1(a) through 1(c) show an example case where two images are composed. FIG. 2 is a main flowchart detailing the processing procedure of the present image composite processing method.

FIGS. 1(a) and 1(b) are respectively a first image 202a of an object to be read on the original document 2 in a first reading range 200 and a second image 202b of the object in a second reading range 201 formed before the composite processing in such a manner to have duplicate portions of the object. FIG. 1(c) shows a composite image 202 after the first image 202a and second image 202b are composed to a single image through the composite processing.

The first image 202a and second image 202b respectively on the first reading range 200 and second reading range 201 are read by the image reading section of the image composite processing apparatus 1, and stored respectively into the field memories 11 and 12 through the filter circuit 10. For example, the read image data of the first image 202a of FIG. 1(a) are stored into the field memory 11 while the read image data of the second image 202b are stored into the field memory 12.

An area 203 in the first reading range 200 and an area 204 in the second reading range 201 of the original document 2 are duplicate areas of the image, where the same content of the image on the original document 2 is read.

Once the images are read in the above manner and the read image data are stored into the field memories 11 and 12, the controller 26 starts the composite processing detailed in FIG. 2. To begin with, a composite position is detected in Step 100 (hereinafter, Step is abbreviated to S). More specifically, when a composite product 208 of a signal composite image 202 is obtained from two images in the divided sections, it is necessary to know where each image is positioned in the composite image. Here, a technique disclosed in Japanese Laid-Open Patent Application No. 122606/1993 (Tokukaihei No. 5-122606) is available.

According to this technique, it is found that a point A of FIG. 1(*a*) is identical with a point B of FIG. 1(*b*), based on which the alignment of the first image 202*a* and second image 202*b* is found. Then, address correction data of the image data of the second image 202*b* with respect to the first image 202*a*, which are necessary to compose the first image 202*a* and second image 202*b* to the image 202 of the single composite product 208, are obtained.

Then, a plurality of comparison subject areas 206 are provided in the duplicate area 203 on the first image 202*a*. Likewise, comparison subject areas 207 are provided in the duplicate area 204 on the second image 202*b* and at the matching positions with the comparison subject areas 206 on the first image 202*a* (S110).

Then, in case of monochromic images, a luminance value of each pixel in the comparison subject areas 206 is added up to find a cumulative addition result (added value) α. On the other hand, a luminance value of each pixel in the comparison subject areas 207 is added up to find a cumulative addition result β. In case of color images, chromaticity of each pixel in the comparison subject areas 206 is added up to find the cumulative addition result α, while chromaticity of each pixel within the comparison subject areas 207 is added up to find the cumulative addition result β (S120).

Subsequently, a total of the cumulative addition results α and β is compared with a predetermined threshold value TH (S130). When the latter is smaller than the former, the comparison subject areas 206 and 207 are judged as being a mainly black document. In this case, the areas having either the cumulative addition result α or β, whichever the larger, are adopted as a composite processing area (S140). In other words, when the image is blackish as a whole, the comparison subject areas 206 and 207 are judged as the mainly black images. Here, if the cumulative addition result a of the comparison subject areas 206 is larger than the cumulative addition result β of the comparison subject areas 207, the image data of the comparison subject areas 206 are adopted.

On the other hand, when the threshold value TH is equal to or larger than the total of the cumulative addition results α and β, the comparison subject areas 206 and 207 are judged as being a mainly white document. In this case, the areas having either the cumulative addition result α or β, whichever the smaller, are adopted as the subject of the composite processing (S150). In other words, when the image is whitish as a whole, for example, in case of texts or a line image (the one shown in FIG. 1), the threshold value TH is larger than the total of the cumulative addition results α and β. Then, the areas having either the cumulative addition result α or β, whichever the smaller, are adopted. Here, the comparison subject areas 206 having thereon formed an unwanted image shown in FIG. 1(*a*), that is, a noise image 105, are excluded from the subject of the composite processing, and the comparison subject areas 207 of FIG. 1(*b*) are adopted as the subject of the composite processing.

Consequently, when the composite processing method of the present invention is adopted, the noise image 205 is eliminated, and the composite product 208 of the composite image 202 shown in FIG. 1(*c*), from which the noise image 205 is eliminated, can be obtained.

The threshold value TH is a variable that depends on the result of the region separation using a fixed value or known arts (maximum-minimum luminance (chromaticity) difference technique, edge extracting technique using a differential filter, etc.). For example, let the threshold value TH for distinguishing image types, namely, a picture image from a text image, be an example. Then, in case of the image type of FIG. 1 corresponding to the text image, a ratio of an image portion is very small compared with a ratio of a non-image portion (background), and so is the added value of the pixel values. On the other hand, in case of a picture image or the like, the image occupies almost the entire area and the non-image portion hardly exists, and therefore, the cumulative added value of the pixel values is very large. Thus, the threshold value TH for distinguishing the image types can be set readily, and whether the read image is of the picture image type or text image type can be judged.

For example, when the read image is judged as being a picture image, there is a big difference in the added value between an image having the noise image 205 and an image having no noise image 205. In case of the color image including the color information, the color information of an image having the noise image 205 and the color information having no noise image 205 can be readily distinguished from each other. Thus, the noise image 205 can be eliminated in a very secure manner.

Then, whether the adopted area is determined for each of comparison subject areas 206 and 207 in the duplicate areas 203 and 204 is judged. When the adopted areas are not determined for all the comparison subject areas 206 and 207, new comparison subject areas are provided, and the cumulative addition results are computed and the comparison processing and selection processing are carried out subsequently in the same manner as above (S110–S160). When the adopted areas are determined for all the comparison subject areas 206 and 207, the image data of the composite image 202 can be obtained using the first image 202*a* other than the duplicate area 203, the second image 202*b* other than the duplicate area 204, and the adopted areas in the duplicate areas 203 and 204 determined in the processing up to S160 (S170). Consequently, the composite product 208 can be obtained through the output apparatus as a final product.

Details of Composite Processing Method of the Present Invention

Next, the image composite processing carried out by the image composite processing apparatus 1 will be detailed further in the following. More specifically, example processing for composing two images in the divided sections shown in FIGS. 1(*a*) and 1(*b*) will be explained.

Figure 4:
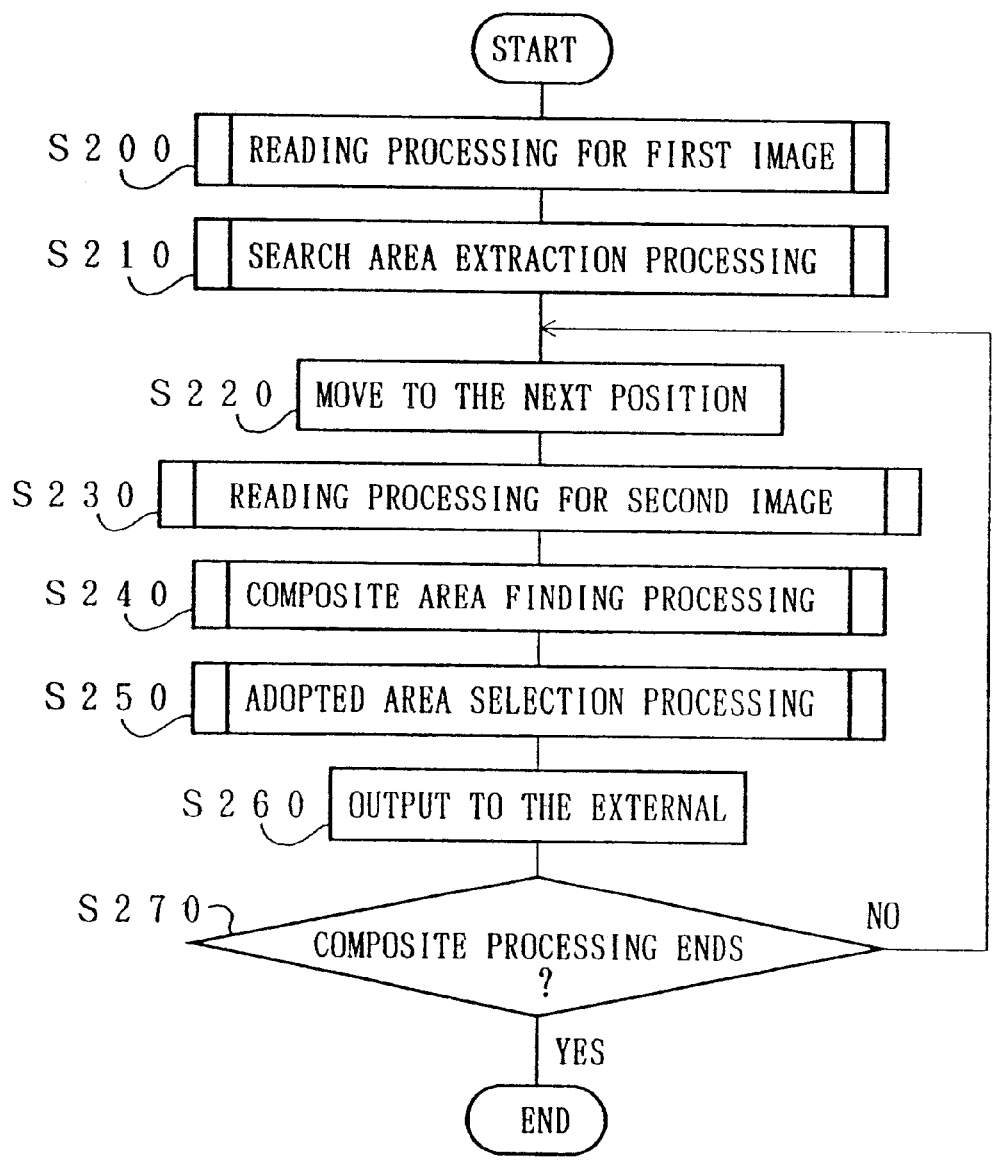
FIG. 4 is a main flowchart detailing a composite processing control including image reading processing by the above image composite processing apparatus.
Figure 5:
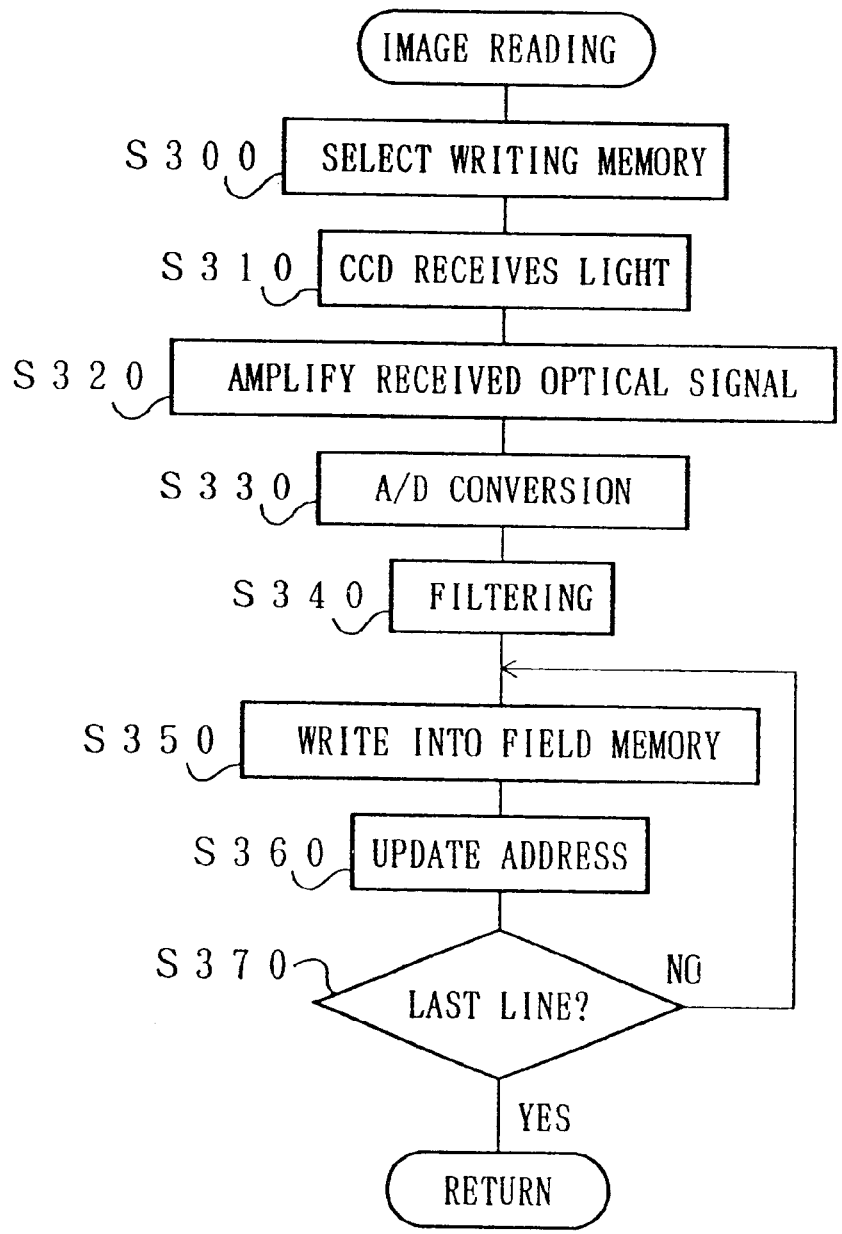
FIG. 5 is a flowchart detailing a control of image reading processing for image composition in the flowchart of FIG. 4.
Figure 6:
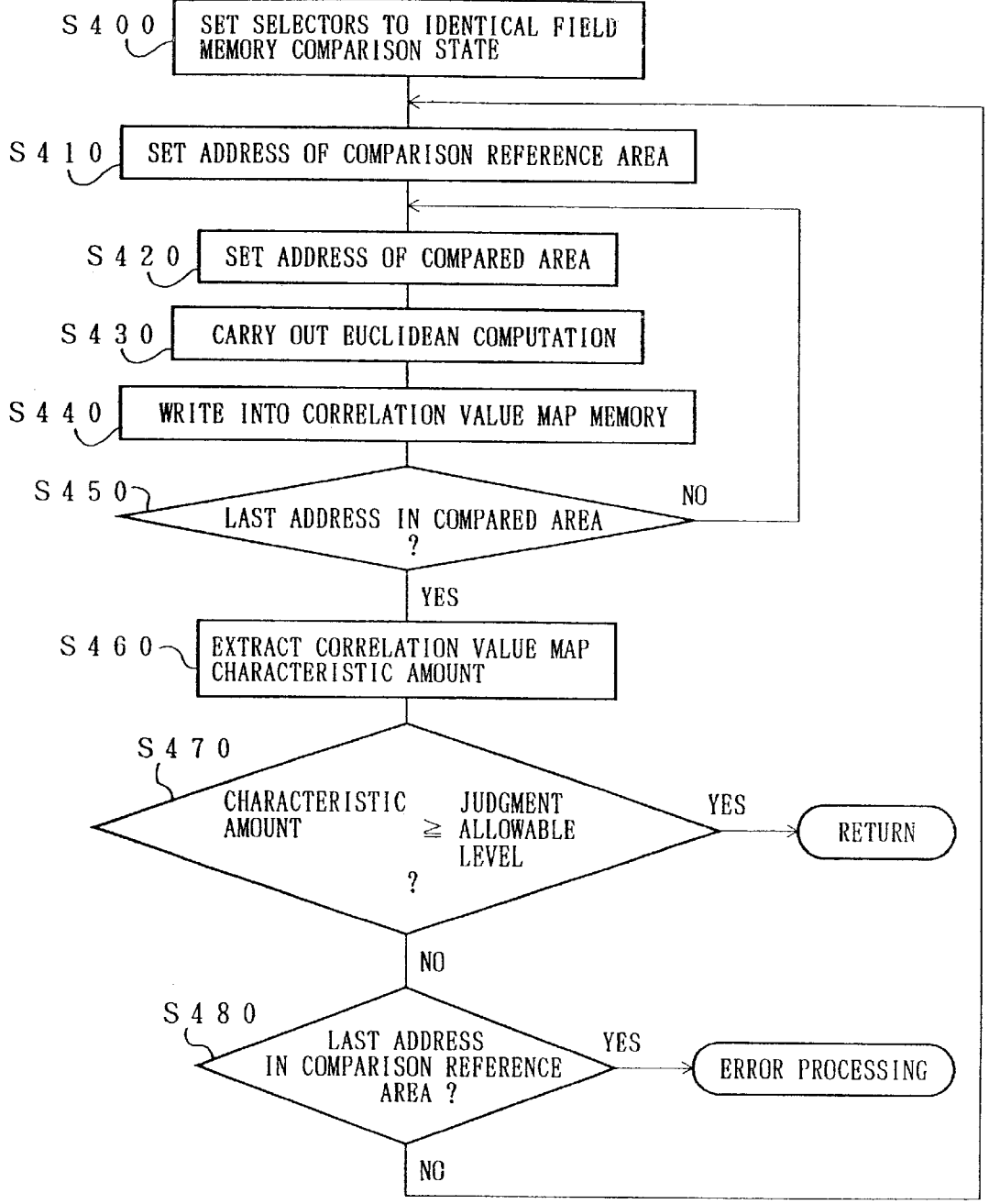
FIG. 6 is a flowchart detailing a control of search area extraction processing for image composition in the flowchart of FIG. 4.
Figure 7:
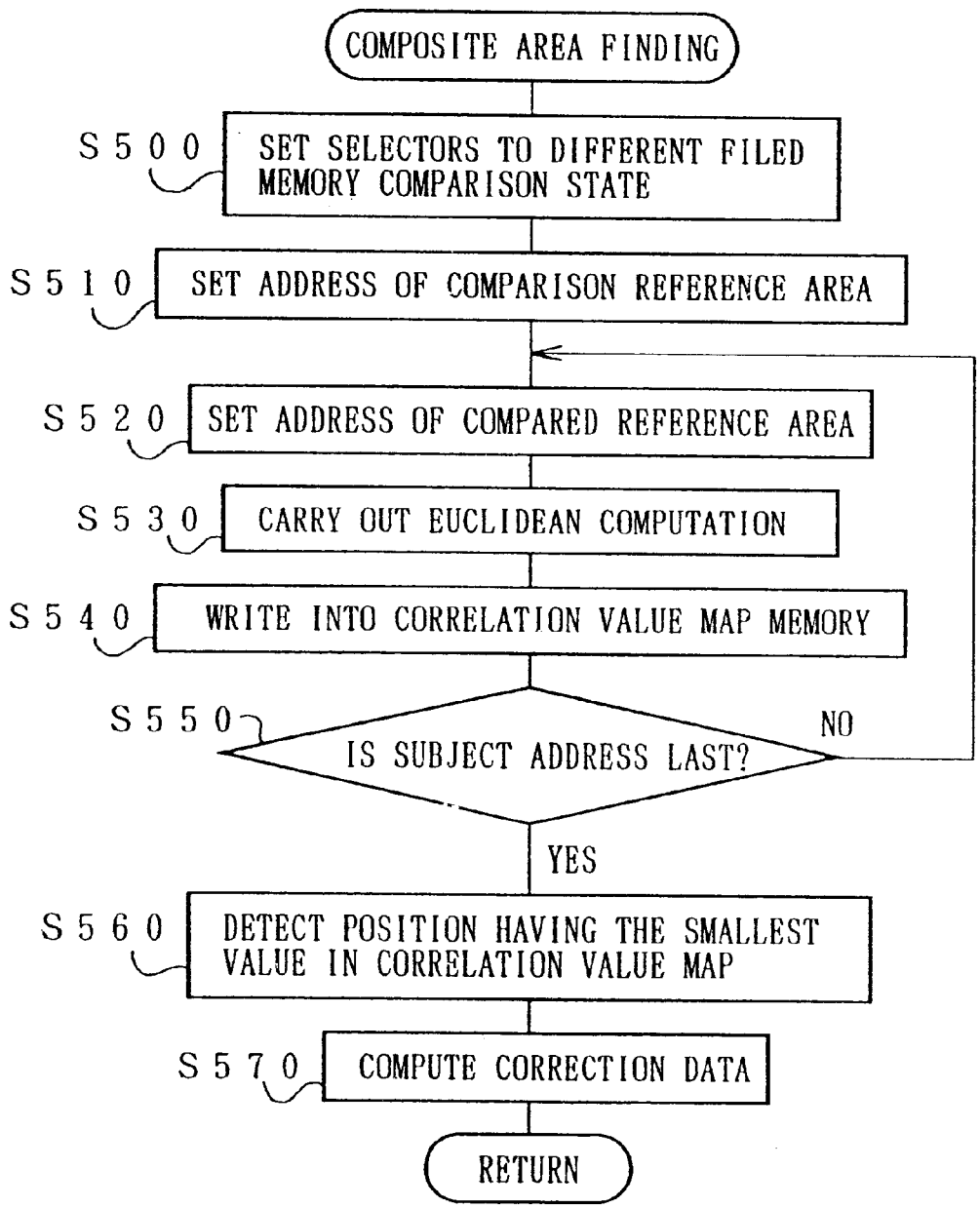
FIG. 7 is a flowchart detailing a control of composite area extraction processing for image composition in the flowchart of FIG. 4.
Figure 8:
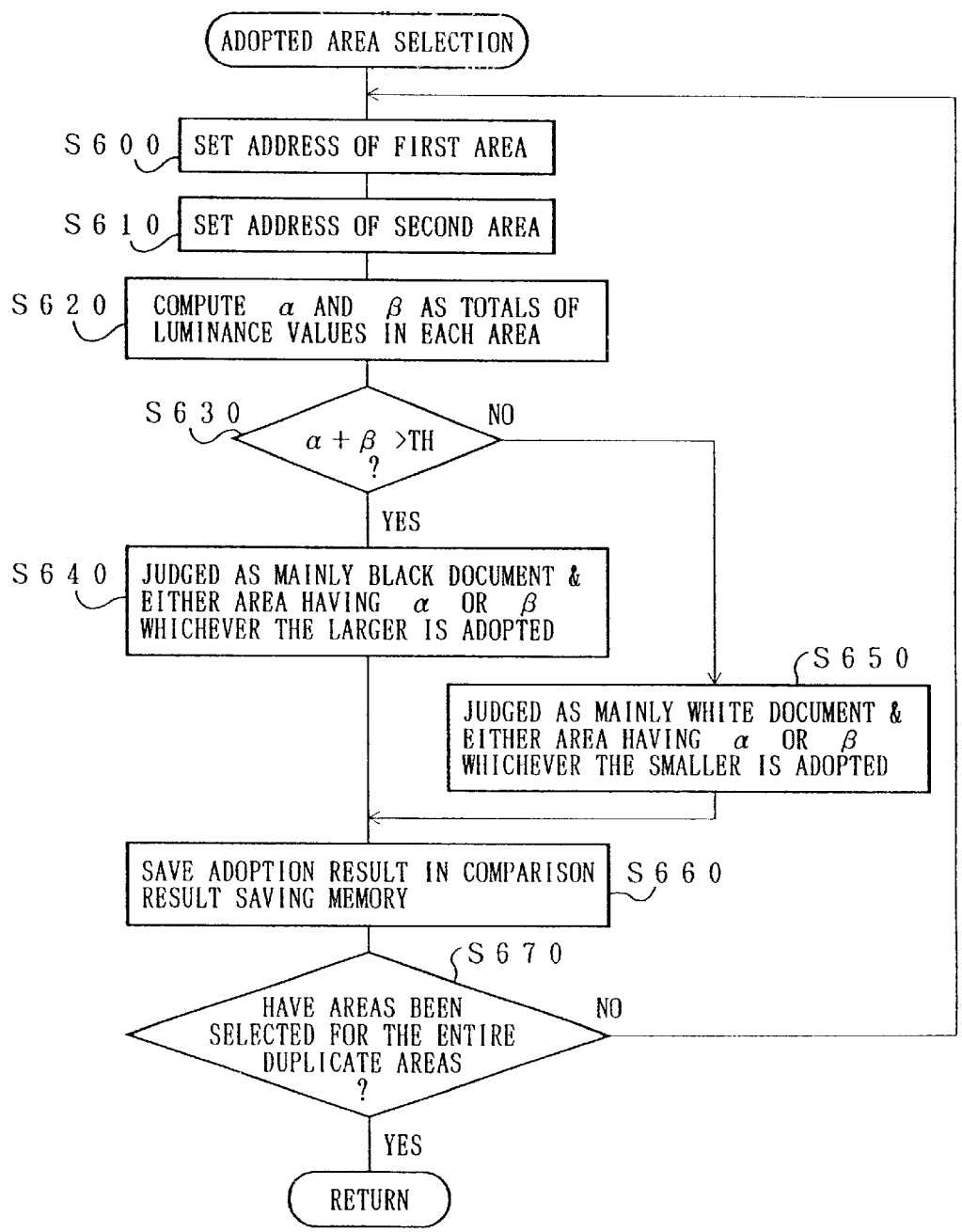
FIG. 8 is a flowchart detailing a control of image's adopted area selection processing in accordance with the present embodiment for image composition in the flowchart of FIG. 4.
Figure 9:
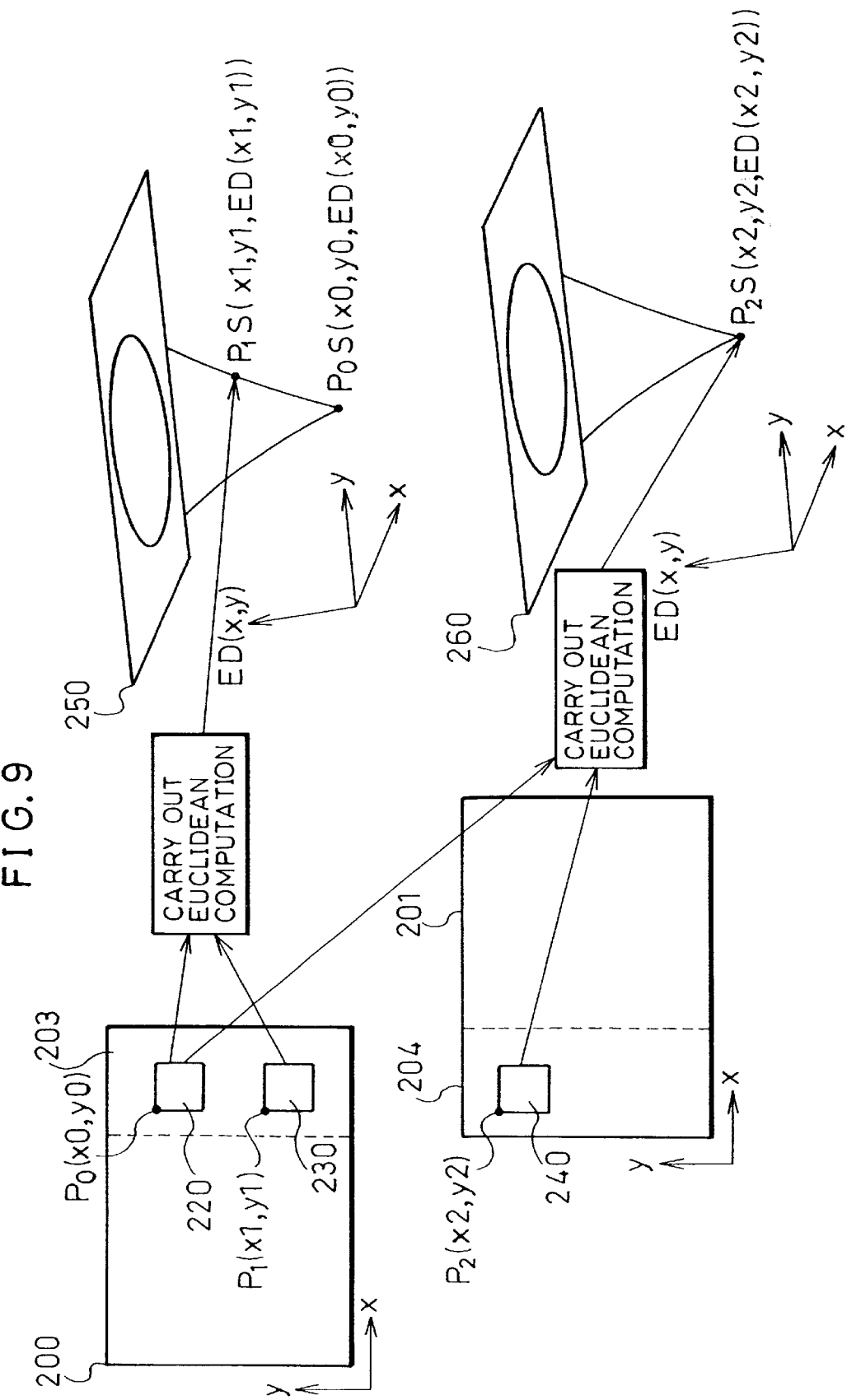
FIG. 9 is a view explaining image processing by the above image composite processing apparatus.
Figure 10A:
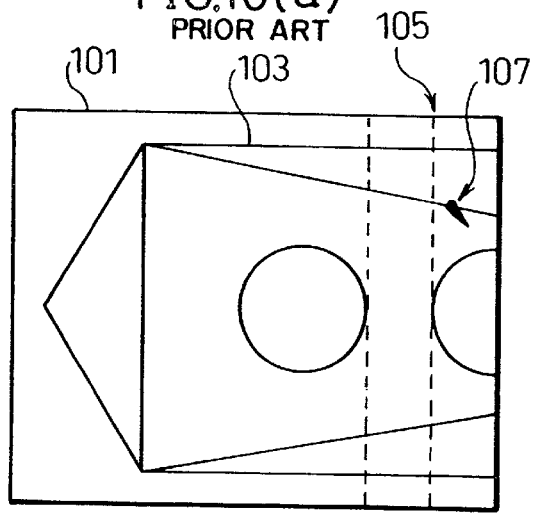
FIGS. 10(*a*) through 10(*c*) are views explaining a conventional image composite processing method.
Figure 10B:
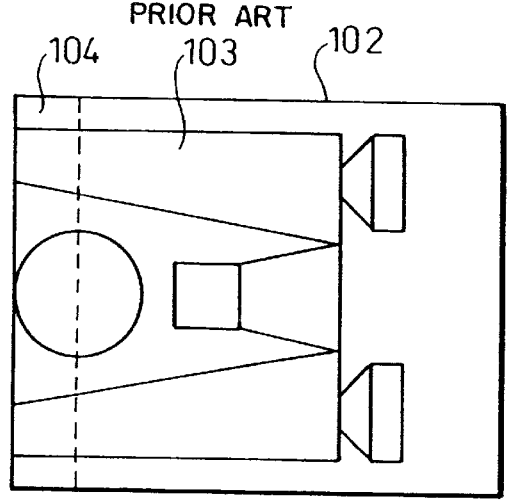
Figure 10C:
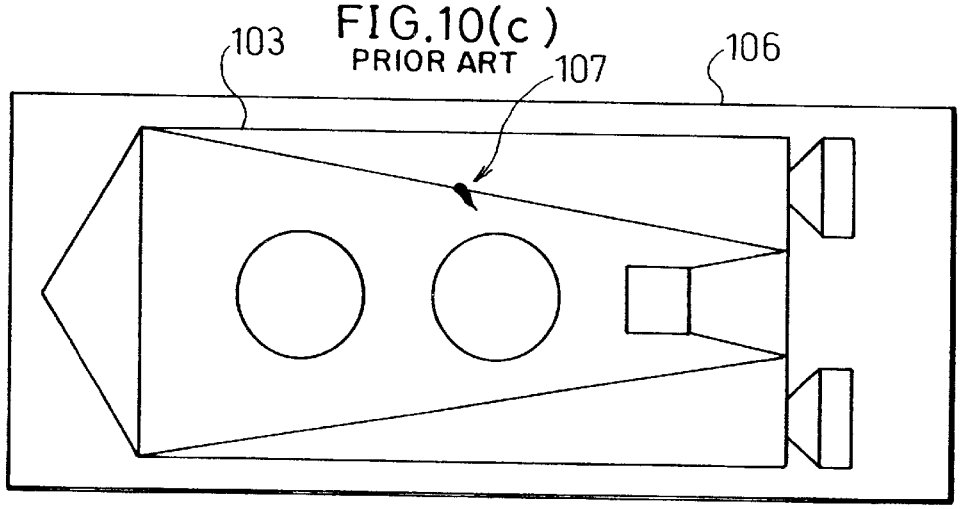

FIG. 4 is a main flowchart detailing a composite processing procedure carried out by the image composite processing apparatus 1. FIG. 5 is a flowchart detailing original document reading processing. FIG. 6 is a flowchart detailing search area extraction processing. FIG. 7 is a flowchart detailing composite area extraction processing. FIG. 8 is a flowchart detailing adopted area selection processing procedure for carrying out the composite processing. FIG. 9 is a schematic view of a correlation value map generated during the image composite processing.

Here, the explanation is given with reference to the flowchart of FIG. 4. The image composite processing apparatus 1, when composing two images in the divided sections, stops the halogen lamp 5 and photo-receiving section 7 at a first stopping position, which corresponds to the first reading range 200 of the original document 2, and carries out the reading processing with an image in the first reading range 200 (S200). Then, the image composite processing apparatus 1 carries out computation processing for extracting a search area in the first image 202a, which is used as a reference when composing the images (S210).

Then, the image composite processing 1 moves the halogen lamp 5 and photo-receiving section 7 further to a second stopping position by means of the moving motor 6 (S220), and carries out the reading processing with an image in the second reading range 201 of the original document 2 (S230) Subsequently, the image composite processing apparatus 1 carries out the computation processing for finding a composite area that matches with the above search area in the second image 202b in the second reading range 201 thus read (S240).

The image composite processing apparatus 1 selects the adopted areas in the duplicate areas 203 and 204 based on the position of the composite area thus found (S250), and outputs the first image 202a and second image 202b to the external (S260). When there is a third image in another divided section, S220–S260 are repeated (S270). In other words, S220–S260 are repeated until the composite processing is carried out for all the images in the divided sections (S270).

Here, S200, S210, S230–S250 will be detailed further in the following.

To begin with, the processing in S200 will be explained with reference to the flowchart of FIG. 5. In the reading processing with the first image 202a, the controller 26 drives the moving motor 6 to move the halogen lamp 5 and photo-receiving section 7 to the first stopping position. Further, the controller 26 selects the first field memory 11 (S300), and drives the halogen lamp 5 to read the first image 202a in the first reading range 200 of the original document 2 (S310).

A photo-receiving signal of the photo-receiving section 7 is amplified by the amplifier 8 (S320), converted to the digital data by the A/D convertor 9 (S330), subjected to the filtering by the filter circuit 10 (S340), and finally, saved in the selected first field memory 11 as the read image data (S350). The writing processing of the image data into the first field memory 11 is carried out by, for example, per line to the last line while the address generator 13 is updating the writing addresses in the field memory 11 (S360 and S370).

According to the processing in S300–S370, of all the images obtained by dividing the image 202 on the original document 2, the first image 202a is read, and the read image data are saved in the first field memory 11.

Then, the search area extraction processing in S210 of FIG. 4 will be explained with reference to the flowchart of FIG. 6.

To begin with, the controller 26 sets the selectors 15 and 16 to an identical field memory comparison state (S400). The identical field memory comparison state is a state where image data of two areas in either of the field memories are compared. In the identical field memory comparison state, the selectors 15 and 16 input the read image data retrieved from the first field memory 11 into the Euclidean computer 20.

Then, the controller 26 sets addresses of a comparison reference area and a compared area (S410 and S420).

Here, as can be understood from FIGS. 1 and 9, the minimum size of the duplicate area 203 in the first reading range 200, which is a partial duplicate of the second reading range 201, is determined in advance. A comparison reference area 220 and a compared area 230 are provided in the duplicate area 203.

The sizes of the comparison reference area 220 and compared area 230 are also determined in advance. The comparison reference area 220 and compared area 230 are identified with coordinate points P0 (x0, y0) and P1 (x1, y1) in the field memory 11, respectively.

Thus, the controller 26 sets the addresses corresponding to the coordinate points P0 and P1 in the address generator 13 as the addresses of the comparison reference area 220 and compared area 230, respectively.

According to the processing in S400–S420, of the entire first reading range 200 saved in the first field memory 11 as the read image data, the read image data included in the comparison reference area 220 and compared area 230 are inputted into the Euclidean computer 20 through the selectors 15 and 16, respectively.

The Euclidean computer 20 finds an Euclidean distance ED of the input image data in the compared area 230 with respect to the input image data included in the comparison reference area 220 in accordance with the following Equation (1):

$$ED(x1, y1) = \sum_{\Delta x=0}^{m-1} \sum_{\Delta y=0}^{n-1} (L(x1 + \Delta x, y1 + \Delta y) - L(x0 + \Delta x, y0 + \Delta y))^2 \qquad \text{Equation (1)}$$

where x0 and y0 are the x-coordinate and y-coordinate of the comparison reference area, respectively; x1 and y1 are the x-coordinate and y-coordinate of the compared area, respectively; ED(x, y) is a correlation value (Euclidean computation value) at the coordinate point (x, y); L(x, y) is the luminance (chromaticity in case of color images) at the coordinate point (x, y); m is a size of the comparison subject areas in the x direction; and n is a size of the comparison subject areas in the y direction (S430).

Here, L is the luminance or chromaticity of the image data of each pixel and m and n are the numbers of the pixels in the x direction and y direction in the comparison reference area 220 and compared area 230 of FIG. 9, respectively. Thus, the Euclidean computer 20 finds a square of a difference in luminance or chromaticity between the image data included in the compared area 230 and the image data in the corresponding positions in the comparison reference area 220, and computes a sum of the values in the compared area 230 as the Euclidean distance ED. The Euclidean computer 20 stores the Euclidean distance ED thus computed into the correlation value map memory 22 (S440).

Then, the controller 26 allocates the compared areas successively in the duplicate area 203 excluding the compared reference area 220, and computes the Euclidean distance ED of each compared area with respect to the comparison reference area 220, which are stored in the correlation value map memory 22 (S420–S450), whereby a correlation value map 250 for the comparison reference area 220 is created in the correlation value map memory 22.

Then, the correlation value map characteristic amount generator 25 extracts (1) a difference S between the smallest Euclidean distance ED of all the Euclidean distances ED forming the correlation value map 250 and the second smallest Euclidean distance ED, and (2) a quadratic differential value T for x and y in the Euclidean distance ED both as the characteristic amounts of the correlation value map 250 of the comparison reference area 220. Also, the correlation value map characteristic amount generator 25 outputs these extracted characteristic amounts S and T to the controller 26 (S460).

The controller 26 confirms whether the comparison reference area 220 can be distinguished clearly from the other areas or not based on the extracted characteristic amounts S and T (S470). When the characteristic amounts S and T are above a judgment allowable level and the comparison reference area 220 can be distinguished clearly from the other areas, the controller 26 determines the comparison reference area 220 as the search area, and proceeds to the following processing.

When the characteristic amounts S and T are below the judgement allowable level, and the comparison reference area 220 can not be distinguished clearly from the other areas, the controller 26 judges whether the current comparison reference area 220 is the last area in the duplicate area 203 (S480). When the current comparison reference area 220 is not the last area, the controller 26 sets another area in the duplicate area 203 as the comparison reference area 220, and carries out S410–S470 to create the correlation value map with each compared area 230 and extract the characteristic amounts.

On the other hand, when the current comparison reference area 220 is the last area, the controller 26 carries out error processing because there exists no search area (S480).

Next, the reading processing with the second image 202b in the second image range 201 in S230 of FIG. 4 will be explained. In S220, the controller 26 moves the halogen lamp 5 and photo-receiving section 7 further to the second stopping position by means of the moving motor 6. Then, the controller 26 selects the second field memory 12 and carries out the reading processing in the same manner as S200 of FIG. 4, where the first image 202a is read. Consequently, of the two image ranges of the image on the original document 2, the controller 26 saves the read image data read from the second image 202b into the second field memory 12.

As has been explained, the first image 202a and second image 202b are read and stored in the first field memory 11 and second field memory 12, respectively. Then, to compose the first image 202a and second image 202b, the composite area finding processing is carried out for the composite processing in S240 of FIG. 4.

The above composite area finding processing will be detailed with reference to the flowchart of FIG. 7. In the composite area finding processing, the controller 26 sets the selectors 15 and 16 to a different field memory comparison state (S500). The different field memory comparison state is a state where the area image data in the first field memory 11 and second field memory 12 are compared.

In the different field memory comparison state, the selectors 15 and 16 input the image data respectively retrieved from the first filed memory 11 and second field memory 12 to the Euclidean computer 20. Then, the controller 26 sets the addresses of the comparison reference area and compared area in the address generators 13 and 14, respectively (S510 and S520).

Here, the address of the comparison reference area set in S510 is the address of the search area computed through the processing in S210 of FIG. 4. In other words, as has been explained with reference to FIG. 6, it is the address of the comparison reference area, which was found as the most characteristic image to enable the composite processing. Here, the area 220 of FIG. 9 will be explained as the search area for the explanation's convenience.

Also, the address of the compared area set in S520 is, as is illustrated in FIG. 9, the address of a coordinate point P2 (x2, y2) representing an area 240 of a predetermined size in the duplicate area 204 in the second image range 201, which will overlap the first image 202 when two images are composed.

The selector 15 retrieves the image data of the search area 220 from the first field memory 11 and inputs the same to the Euclidean computer 20. On the other hand, the selector 16 retrieves the image data of the compared area 240 from the second field memory 12 and inputs the same to the Euclidean computer 20.

Then, the Euclidean computer 20 carries out the processing in the same manner as S430 of FIG. 6 (S530), and stores the Euclidean distances ED of the image data included in the compared area 240 with respect to the image data included in the comparison reference area 220 used as the search area into the correlation value map memory 22 (S540).

The controller 26 allocates the compared areas 240 in the duplicate area 204 successively, and computes the Euclidean distance ED of each compared area 240 with respect to the comparison reference area 220, and stores the same in the correlation value map memory (S520–S550). Consequently, a correlation value map 260 for the comparison reference area 220 used as the search area is created in the correlation value map memory 22.

The correlation value map characteristic value generator 25 finds the data having the smallest Euclidean distance ED on the correlation value map 260 created in the correlation value map memory 22 (S560). Further, the correlation value map characteristic value generator 25 outputs the address of the compared area 240 having the smallest Euclidean distance ED to the controller 26. The compared area 240 having the smallest Euclidean distance ED on the correlation value map 260 is assumed to be a composite area that matches with the search area (comparison reference area 220) of the first image 202a.

The controller 26 computes correction data Mx and My for the image data saved in the field memory 12 in accordance with Equation (2):

$$Mx = x0 - x2$$

$$My = y0 - y2 \hspace{4cm} \text{Equation (2)}$$

where Mx and My are moved distances in the x direction and y direction, respectively; x0 and y0 are the x position and y position before the moving; and x2 and y2 are the x position and y position after the moving.

Here, the point P0 (x0, y0) of FIG. 9 is the coordinate of the point representing the search area 220 in the first image 202a, and the point P2 (x2, y2) is the coordinate of the point representing the composite area 240 in the second image 202b. The correction data Mx and My obtained by the above computation in accordance with Equation (2) are subtracted from the coordinate data corresponding to the first field memory 11 or added to the coordinate data corresponding to the address of the second field memory 12, whereby the image data saved in the second field memory 12 and the image data saved in the first field memory 11 have continuous addresses.

Once the composite positions are found and there exist matching areas as has been explained, the selection processing is carried out in S250 of FIG. 4. In the selection processing, either the duplicate area 203 or 204 is selected as an adopted area. The selection processing will be detailed in the following with reference to FIG. 8.

In the selection processing for selecting either the area 203 or 204 as the adopted area, the controller 26 corrects the data with the correction data, and as shown in FIG. 1, provides the first comparison subject areas 206 of a predetermined size in the duplicate area 203. Then, the controller 26 sets an address of their representing point C in the address generator 13 (S600). Also, after having corrected the data with the correction data, the controller 26 provides the second comparison subject areas 207 of a predetermined size in the duplicate area 204, and sets an address of their representing point D in the address generator 14 (S610).

The selector 15 retrieves the image data of the first comparison subject areas 206 from the first field memory 11, and outputs the same to the pixel value adder 18. The selector 16 retrieves the image data of the second comparison subject areas 207 from the second field memory 12, and outputs the same to the pixel value adder 19. The pixel value adder 18 outputs the cumulative addition result $\alpha$ of each input pixel value in the first comparison subject areas 206. The pixel value adder 19 outputs the cumulative addition result $\beta$ of each input pixel value in the second comparison subject areas 207 (S620).

The cumulative addition results (values) $\alpha$ and $\beta$ are inputted into the pixel value comparator 21 from the pixel value adders 18 and 19, and compared with the predetermined threshold value TH (S630). The threshold value TH is set to, for example, a value used when determining whether an image 202 on the original document 2 (an image except for the background) is a mainly black image or not. Thus, the comparator 21 compares a sum of the cumulative addition results (values) $\alpha$ and $\beta$ inputted from the pixel value adders 18 and 19 with the threshold value TH (S630). When the latter is smaller than the former, the first comparison subject areas 206 and second comparison subject areas 207 are judged as being mainly black images, and the areas having either the cumulative addition result $\alpha$ or $\beta$, whichever the larger, are adopted (S640).

Alternatively, in the comparison processing in S630, when the threshold value TH is equal to or larger than the cumulative addition results $\alpha$ and $\beta$, the first comparison subject areas 206 and second comparison subject areas 207 are judged as being mainly white images, and the areas having either the cumulative addition result $\alpha$ or $\beta$, whichever the smaller, are adopted (S650).

In the above selection processing, the cumulative addition result $\alpha$ may be compared with the cumulative addition result $\beta$, so that, depending on a difference value, a warning is given to the user or the user is allowed to specify which area should be selected. More specifically, when the difference is large, it is apparent in which area the noise image 205 is formed, but when the difference is small and the existence or position of the noise image 205 is rather obscure. Thus, in such a case, it may be arranged that the user is allowed to make his selection arbitrary. For example, when the resulting composite image is unsatisfactory, the user can reverse the selection instruction, so that another composite image is outputted, thereby obtaining a satisfactory composite product 208.

Then, information as to which areas are selected as the adopted areas is saved in the comparison result saving memory 24 (S660) Then, whether the adopted areas are determined for all the portions in the duplicate areas 203 and 204 is judged (S670). When the adopted areas are not determined for all the portions in the duplicate areas 203 and 204, a new area is provided and the cumulative added values $\alpha$ and $\beta$ are computed, so that the comparison processing and selection processing are carried out subsequently in the same manner as above (S600–S670).

When the adopted areas are determined for all the portions in the duplicate areas 203 and 204, the controller 26 gives a command to the selector 17 with reference to the correction data determined in S240 of FIG. 4 and the content in the comparison result saving memory 24. Upon receipt of the command, the selector 17 takes out the image data of the first image 202a in the first field memory 11 and the second image 202b in the second field memory 12 except for their respective duplicate portions, and the duplicate areas determined and adopted in S250, and outputs the resulting composite image 202 to the external. The above composite processing is carried out until all the images in the divided sections are composed (S220–S270).

In the example of FIG. 1, when the cumulative added values $\alpha$ and $\beta$ respectively of the comparison subject areas 206 and 207 are compared, it turns out that the cumulative added value a of the comparison subject areas 206 is larger than the cumulative added value $\beta$ of the comparison subject areas 207. Hence, the comparison subject areas 207 are selected as the adopted area. Consequently, the noise image 205, caused when dust or the like on the optical system is read, is eliminated as the comparison subject areas 207 are adopted based on the comparison result.

When a total of the cumulative added values $\alpha$ and $\beta$ for the comparison subject areas 206 and 207 is smaller than the threshold value TH, either the comparison subject areas 206 or 207 are selected as the adopted area as previously mentioned. In this case, the images on the comparison subject areas 207 are adopted by obtaining an AND output of the image data of the comparison subject areas 206 and 207, thereby eliminating the noise image 205. Consequently, the AND output of the comparison subject areas 206 and 207 is found immediately without comparing the largeness of the cumulative added values $\alpha$ and $\beta$.

Also, when dust or the like adheres to the photo-receiving section 7 and the noise image 205 of FIG. 1 is read, an identical noise image 205a is formed at the same position when the photo-receiving section 7 is moved to the second reading region 201 by means of the moving motor 6. In this case, if an identical image is detected when the duplicate area 203 is compared with its corresponding area 203a, the detected image of the same shape can be eliminated as being the noise image 205a.

In the present embodiment, the comparison subject areas 206 and 207 are provided to further divide the duplicate areas 203 and 204. However, the arrangement is not limited to this, and the above composite processing can be carried out on the duplicate areas 203 and 204 entirely without providing the comparison subject areas 206 and 207.

As has been explained, according to the image composite processing method of the present invention, when at least two images in the divided sections are composed, even if an unwanted image is formed on either of the duplicate areas of the two images, the unwanted image can be eliminated efficiently, thereby making it possible to obtain a desired composite image.

In addition, a portion having the unwanted image in the duplicate areas can be confirmed by providing the comparison subject areas in the duplicate areas and determining which portions should be adopted. Consequently, the elimination can be carried out in a secure manner.

Also, since which duplicate area should be adopted is determined based on the read pixel values in the duplicate areas, the adopted area can be determined through a relatively simple method. Moreover, the types of read images, such as picture image type and a text image type, can be distinguished from each other, thereby making it possible to eliminate the unwanted image efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image composite processing method for composing subject images of respective partially overlapping adjoining portions of an original image, each said subject image including a sub-image area containing an image of the portion of the original image that overlaps with the adjoining subject image, into a single composite image based on an image contained in a retrieved comparable sub-image area of said original image, wherein the subject images are composed into a single composite image by comparing the sub-image areas of every two adjoining subject images, and determining a sub-image area to be adopted according to an image type of the sub-image areas which corresponds to the sub-image area of the original image and not adopting the other one based on a comparison result.

2. The image processing method of claim 1, wherein each of said sub-image areas are divided into a plurality of comparison subject areas, so that said sub-image areas of said adjoining subject images are compared per divided comparison subject area and the divided subject comparison area most closely matching the divided comparison subject area of the retrieved original image is adopted, and the other one is not adopted based on each comparison result.

3. The image composite processing method of claim 1, wherein one of the sub-image areas is adopted by adding each pixel value of said sub-image areas cumulatively and comparing addition results.

4. The image composite processing method of claim 3, wherein, before cumulative addition values of the pixel values in the sub-image areas are compared, the total of the cumulative added values is compared with a predetermined threshold value to judge the image type based on a comparison result, so that the sub-image area whose cumulative addition value is the larger or the smaller is determined as said adopted area based on a judged image type.

5. The image composite processing method of claim 2, wherein which comparison subject area should be adopted is determined by adding each pixel value in the comparison subject areas cumulatively and comparing addition results.

6. The image composite processing apparatus of claim 5, wherein, before cumulative addition values of the pixel values in the sub-image areas are compared, the total of the cumulative added values is compared with a predetermined threshold value to judge the image type based on a comparison result, so that the sub-image area whose cumulative addition value is the larger or the smaller is determined as said adopted area based on a judged image type.

7. An image composite processing apparatus for composing subject images of respective partially overlapping adjoining portions of an original image, each said subject image including a sub-image area containing an image of the portion of the original image that overlaps with the adjoining subject image, into a single composite image based on an image contained in a retrieved comparable sub-image area of said original image, wherein the subject images are composed into a single composite image by comparing the sub-image areas of every two adjoining subject images, and determining a sub-image area to be adopted according to an image type of the sub-image areas which corresponds to the sub-image area of the original image and not adopting the other one based on a comparison result.

8. The image composite processing apparatus of claim 7, wherein each of said sub-image areas are divided into a plurality of comparison subject areas, so that said sub-image areas of said adjoining subject images are compared per divided comparison subject area and the divided comparison subject area most closely matching the divided comparison subject area of the retrieved original image is adopted, and the other one is not adopted based on each comparison result.

9. The image composite processing apparatus of claim 7, wherein one of the sub-image areas is adopted by adding each pixel value of said sub-image areas cumulatively and comparing addition results.

10. The image composite processing apparatus of claim 9, wherein, before cumulative addition values of the pixel values in the sub-image areas are compared, the total of the cumulative added values is compared with a predetermined threshold value to judge the image type based on a comparison result, so that the sub-image area whose cumulative addition value is the larger or the smaller is determined as said adopted area based on a judged image type.

11. The image composite processing apparatus of claim 8, wherein which comparison subject area should be adopted is determined by adding each pixel value in the comparison subject areas cumulatively and comparing addition results.

12. The image composite processing apparatus of claim 11, wherein, before cumulative addition values of the pixel values in the sub-image areas are compared, the total of the cumulative added values is compared with a predetermined threshold value to judge the image type based on a comparison result, so that the sub-image area whose cumulative addition value is the larger or the smaller is determined as said adopted area based on a judged image type.

13. An image composite processing apparatus for composing subject images of respective partially overlapping adjoining portions of an original image, each said subject image including a sub-image area containing an image of the portion of the original image that overlaps with the adjoining subject image, into a single composite image based on an image contained in a retrieved comparable sub-image area of said original image, comprising:

first storage means for storing image data of a first image of one of every two adjacent images including respective partially overlapping adjoining sub-image areas of said original image;

second storage means for storing image data of a second image of the other of every two adjacent images including respective partially overlapping adjoining sub-image areas of said original image;

a comparator for comparing the sub-image areas of the first and second images based on the image data thereof, and for determining a sub-image area to be adopted according to an image type of the sub-image areas which corresponds to the sub-image area of the original image and not adopting the other one based on a comparison result; and a controller for issuing a command to compose the first and second images into a single image based on an adoption result.

14. The image composite processing apparatus of claim 13, wherein each of said sub-image areas are divided into a plurality of comparison subject areas, so that said sub-image areas of said adjoining subject images are compared per divided comparison subject area and the divided comparison subject area most closely matching the divided comparison subject area of the retrieved original image is adopted, and the other one is not adopted based on each comparison result.

15. The image composite processing apparatus of claim 14, further comprising:

a first pixel value adder for adding each pixel value in the comparison subject areas of the image data of the first image cumulatively; and a second pixel value adder for adding each pixel value in the comparison subject areas of the image data of the second image cumulatively, wherein said comparator determines which comparison subject area should be adopted by comparing addition results of said first and second pixel value adders.

16. The image composite processing apparatus of claim 15, wherein, before cumulative addition values of the pixel values in the sub-image areas are compared, the total of the cumulative added values is compared with a predetermined threshold value to judge the image type based on a comparison result, so that the sub-image area whose cumulative addition value is the larger or the smaller is determined as said adopted area based on a judged image type.

17. The image composite processing method of claim 1, wherein the image type is determined by comparing a value derived from the sub-image areas of the subject images with the threshold value of the image of the original document.

18. The image composite processing apparatus of claim 7, wherein the image type is determined by comparing a value derived from the sub-image areas of the subject images with the threshold value of the image of the original document.

19. The image composite processing apparatus of claim 13, wherein the image type is determined by comparing a value derived from the sub-image areas of the subject images with the threshold value of the image of the original document.

20. An image composite processing method for composing subject images of respective partially overlapping adjoining portions of an original document image, each said subject image including a sub-image area containing an image of the portion of the original document image that overlaps with the adjoining subject image, into a single composite image based on an image contained in a retrieved comparable sub-image area of said original document image, wherein the subject images are composed into a single composite image by comparing the sub-image areas of every two adjoining subject images with the threshold value of the original document image, and adopting the one of the sub-image areas that contains the image portion most closely matching the threshold value of the image portion contained in a retrieved comparable sub-image area of the original document image and not adopting the other one based on a comparison result; and wherein each of said sub-image areas is divided into a plurality of comparison subject areas, so that said sub-image areas of said adjoining subject images are compared per divided comparison subject area and the divided comparison subject area most closely matching the divided comparison subject area of the retrieved original document image is adopted, and the other one is not adopted based on each comparison result.

* * * * *